United States Patent [19]

Feist et al.

[11] 4,355,901
[45] Oct. 26, 1982

[54] ARRANGEMENT FOR MEASURING THE POSITION OF AN INDEX

[76] Inventors: Wieland Feist, 6, Erfurter-Strasse; Franz Kebschull, 8, Str. der Kosmonauten, both of Jena, District of Gera, German Democratic Rep.

[21] Appl. No.: 192,183

[22] Filed: Sep. 30, 1980

[30] Foreign Application Priority Data

Oct. 10, 1979 [DD] German Democratic Rep. ... 216146

[51] Int. Cl.³ .................. G01B 11/14; G01C 1/02; G01C 1/06; G01D 5/36
[52] U.S. Cl. .................. 356/373; 250/231 SE; 356/150
[58] Field of Search .................. 356/372–373, 356/375, 138–139, 141, 147–149, 150, 152; 33/283–284, 366; 250/231 SE

[56] References Cited

U.S. PATENT DOCUMENTS

| | | | |
|---|---|---|---|
| 2,837,956 | 6/1958 | Schneider | 356/148 |
| 3,068,741 | 12/1962 | Werner | 356/139 |
| 3,154,626 | 10/1964 | Sisson | 356/375 |
| 4,136,955 | 1/1979 | Aeschlimann et al. | 356/141 |

FOREIGN PATENT DOCUMENTS

| | | | |
|---|---|---|---|
| 138100 | 10/1979 | German Democratic Rep. | 250/231 SE |
| 2027203 | 2/1980 | United Kingdom | 356/375 |

*Primary Examiner*—William H. Punter

[57] ABSTRACT

The invention relates to an arrangement for measuring the position of an index of a surveying device comprising a flat-plate micrometer and at least one swinging index. The interfering oscillations, due to external influences, of the index in the course of a repeated measurement of a graduated circle interval are compensated by balancing the measuring frequency and the interfering oscillation frequency. The frequency of the interfering index oscillations is detected by photodetectors, and compared to the rotation speed of a servo-motor for initiating the frequency of the repeated index measurement both frequencies being adapted to one another via the rotational speed controlled by a frequency controlled unit.

3 Claims, 3 Drawing Figures

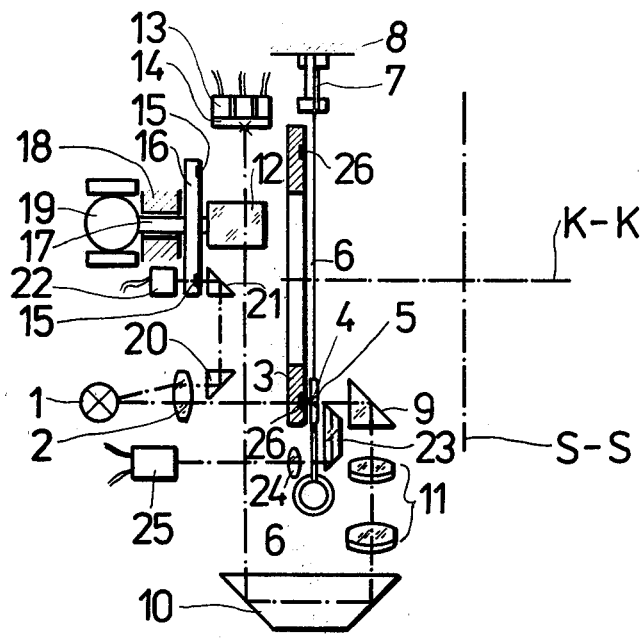
Fig.1
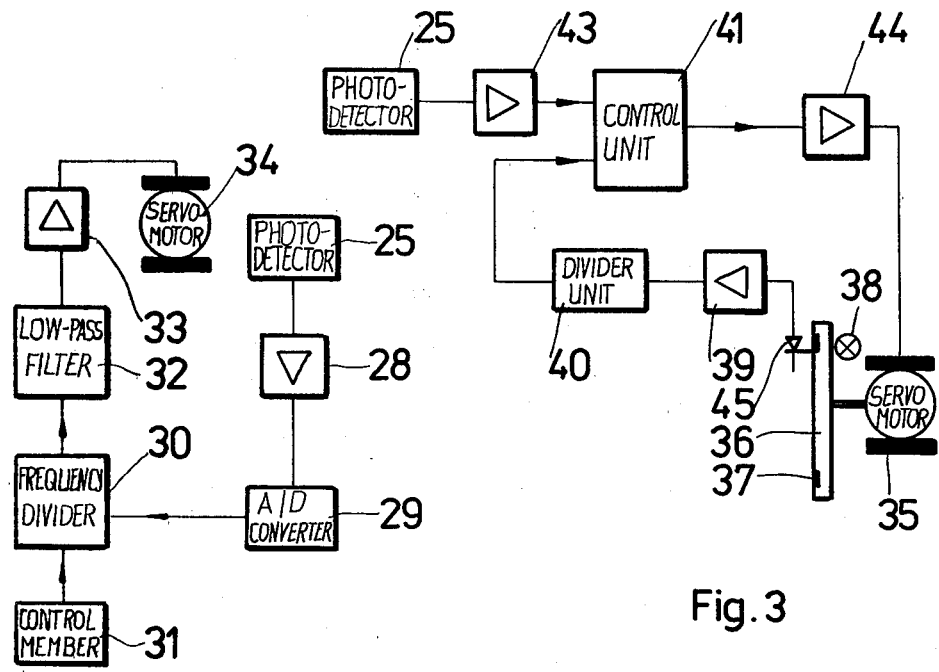
Fig.2
Fig.3

ARRANGEMENT FOR MEASURING THE POSITION OF AN INDEX

The invention relates to an arrangement for repeated measurement of the position of an oscillating index within a graduation interval in which a pulse counting is started by a start pulse and finished by a stop pulse and the pulse counting is repeated at the measuring frequency. The method is particularly for use in angular measurements with geodetic devices, in such events when a reading index is arranged in a pendulum inclinometer or compensator and is subject to undesired oscillations.

Heretofore, a pendulum is used to stabilize the sighting line of a level or the index for the vertical angle indication of a theodolite.

Said pendulum is provided with optical components which influence the sighting line.

Though attenuation means are provided the pendulum is easily excited to horizontal and/or vertical oscillations due to air blast and ground unrest, the frequencies of such oscillations depend on the length of the tripod of the surveying instrument, whereas the amplitudes depend on the intensity of the excitation.

Horizontal oscillations excite the pendulum and hence the index to oscillate about the pendulum axis so interfering an angular measurement, if the latter is feasible at all.

This particular concerns the physical angular measurement where the instantaneous deflection is detected as the measuring value, which is displayed, stored and/or processed so that the mean reading error is far greater than that when a visual reading is performed.

To eliminate the mean reading error a number of physical measurements have to be carried out which considerably increases the entire measuring time.

It has already been tried to reduce the influence of interfering oscillations by use of suitable attenuation means which either reduces the leveling precision or increases the leveling time.

It is an object of the present invention to obviate the above disadvantages.

It is a further object of the present invention to provide an arrangement for eliminating interfering oscillations by relating the measuring of the index within a graduation interval to the interfering oscillation, regardless of the construction and the attenuation of the pendulum, since the interfering oscillations depend on the height of the tripod. These and other objects are realised by an arrangement for measuring the position of an index within a graduation interval comprising means for controlling the measuring frequency and for synchronizing said frequency to the interfering frequency.

Advantageously, the measuring frequency is an integral multiple or any other suitable multiple of the interfering frequencies.

The measuring frequency can be manually or automatically controlled.

Since the physical opto-electronic measurement of the position of an index within a graduation interval is repeatedly performed the number of measurements can be so selected that the mean value of the number of measurements per interfering oscillation at least approximates the actual measuring value.

The control can be performed manually by a respective means or physically by an oscillation detector.

By virtue of the inventional arrangement it is feasible for the first time to control the measuring operation in such a manner that a high leveling precision and a short leveling time are achieved and interfering oscillations are eliminated.

In order that the invention may be more readily understood reference is made to the accompanying drawings which illustrate diagrammatically and by way of example an arrangement for measuring the position of an index in a graduation circle and where FIG. 1 is an optical arrangement of a theodolite, FIG. 2 is a flow scheme for the manual frequency control, and FIG. 3 is a flow scheme of an automatic frequency control.

In FIG. 1 a tilting axis and a tripod axis of a theodolite are designated K—K and S—S, respectively. A vertical circle 3 having a graduation 26 is coaxially seated about the tilting axis K—K.

A light source 1 via a condenser lens 2 illuminates the reading location upon the vertical circle 3.

The former is associated to a reading index 4 mounted on a carrier 5, which is secured to a pendulum 6 suspended via a cross spring joint 7 at the housing 8 (only partially shown) of the theodolite.

The index 4 and the reading location are imaged via prisms 9, 10, an objective 11 and a tiltable plano-parallel plate 12 into the plane of photodetectors 13 which are arranged on a common mount 14.

The plano-parallel plate 12 and a disc 16 are mounted on a axle 17 seated for rotations in a seating 18 in parallel to the axis K—K and driven by a servo-motor 19.

The disc 16 is provided with a graduation 15, a part of which being adjacent a photodetector 22 is illuminated by a portion of the light emitted by the light source 1 via the prisms 20, 21.

The index 4 is imaged via a prism 23 and an objective 24 upon a differential photodetector 25.

The light source 1 can be a suitable diode.

The plano-parallel plate continuously rotates and thus the index 4 and the graduation 26 interval in which the index 4 is present sweep the photodetector 13.

A graduation 26 line produces a start pulse in said photodetector 13, and the index 4 a stop pulse. Between both signals the differential photodetector 22 produces pulses in dependence on the passing graduation 15 lines, the number of said pulses defines and interpolates the position of the index 4 within the respective interval of the circle graduation 26.

Furthermore, a portion of the light radiation is directed from the index 4 to the differential photodetector 25 which produces pulses in dependence on the oscillation position of the image of the index 4.

In FIG. 2 a differential photodetector 25 is electrically connected to an analog-to-digital converter 29 via an amplifier 28 which also includes a phase shifter.

A frequency divider 30 is connected on the one hand to a control member (potentiometer) 31 for manual operation and on the other hand to the A/D converter 29. The frequency divider 30 is connected to a servo-motor 34 via a low-pass filter 32 and an amplifier 33.

The servo-motor 34 drives a plate face plate micrometer (not shown) similar to that of FIG. 1.

The digital values from the A/D converter 29 fed into the frequency divider 30 and the low pass filter 32 and vary the servo-motor potential in the amplifier 33.

When the servo-motor 34 is an a.c. motor (synchronous motor), a variation of the frequency of the pendulum oscillation (FIG. 1) also varies the frequency of the servo-motor rotations. The potentiometer 31 varies the dividing relation of the frequency divider 30. When the servo-motor 34 is a d.c. motor, there is an analog proportional relation between the rotational speed and the potential. In this event a potentiometer for varying the servo-motor 34 potential is connected to the low-pass filter 32.

In FIG. 3 a servo-motor 35 drives a counting disc 36 which is provided with transparent slits 37. Similar to FIG. 1 light from a light source 38 passes a respective slit 37 to impinge upon a photodetector 45 which produces voltage pulses in dependence on the frequency of the counting disc 36.

Said voltage pulses are amplified in an amplifier 39 and fed via a divider unit 40 into an input of a frequency control unit 41, which is also connected via another input to the differential photodetector 25 via an amplifier 43 and both, the divider unit 40 and the photodetector 25 feed pulses into said frequency control unit 41.

A d.c. voltage amplifier connects an output of the unit 41 to the servo-motor 35.

The amplifiers 39 and 43 can be followed by an A/D converter.

In operation, the mechanic oscillations of the index 4 (FIG. 1) are converted in the photodetector 25 into electric pulses of the frequency $f_i$, which are fed into the frequency control unit 41 via the amplifier 43.

A frequency $f_z$ determined by the rotation speed of the servo-motor 35 is derived via the counting disc 36, the photodetectors 45 and the amplifier 39.

By frequency division the divider unit 40 produces a frequency $f_z$ which corresponds to the frequency $f_i$ and which is fed into the frequency control unit 41.

The latter produces in dependence on a balance of the frequencies $f_i$ and $f_z$ a d.c. voltage pulse for re-adjustment of the rotation speed of the servo-motor 35.

When $f_i$ and $f_z$ are balanced a zero-control voltage results.

We claim:

1. Arrangement for the repeated measuring of the position of an oscillating index comprising:
    a graduated circle seated for rotation,
    said index for determining the reading position of said graduated circle,
    a first imaging system,
    a plano-parallel plate,
    a first photodetector,
        said reading position, said first imaging system, said plano-parallel plate and said first photodetector being in optical alignment,
        said reading position being substantially arranged in the object side focal plane of said first imaging system,
    a pendulum,
        said index being secured to said pendulum,
    a servo-motor,
    an axle being secured to said servo-motor for rotating said plano-parallel plate mechanically connected to said axle,
    an interpolator being connected to said axle,
    a second imaging system,
    a second photodetector,
        said index, said second imaging system and said second photodetector being in optical alignment,
        said second imaging system being for imaging said index onto said second photodetector
        the latter being for detecting the oscillation frequency of said index, and
    electronic means for control of said servo-motor rotation frequency,
        said electronic means being arranged between said second photodetector and said servo-motor.

2. An arrangement as claimed in claim 1, wherein an electronic control unit is provided for control of said electronic means.

3. An arrangement as claimed in claim 1, wherein a frequency control unit is provided having two inputs and one output, said two inputs being connected to said second photodetector and to said interpolator, respectively, said one output being connected to said servo-motor.

* * * * *